Patented Sept. 6, 1938

2,129,507

UNITED STATES PATENT OFFICE 2,129,507

CATALYST AND CATALYTIC PROCESS

Paul Lawrence Salzberg, Carrcroft, Wilmington, Del., assignor to E. I. du Pont de Nemours & Company, Wilmington, Del., a corporation of Delaware No Drawing. Application July 30, 1936,
Serial No. 93,417

17 Claims. (Cl. 260—54)

This invention relates to catalysts and catalytic processes and more particularly to highly efficient chromite catalysts and processes for their use. Still more particularly it relates to certain improvements in the process of preparing chromite catalysts described in my copending application Serial No. 743,088, of which this application is a continuation in part.

Several different methods for the preparation of chromite hydrogenation and dehydrogenation catalysts have previously been disclosed, such, for example, as are set forth in detail in U. S. Patents 1,746,782 and 1,964,000 to Wilbur A. Lazier. The chromite catalytic bodies produced as described in these patents, i. e. by igniting a multiple chromate of a nitrogen base and a hydrogenating metal, are particularly efficacious and are characterized by great superiority of catalytic activity as compared with that of catalysts prepared, for example, by the reduction of a chromate by means of hydrogen at temperatures below 600° C.

In addition to the improved catalytic effect produced by the catalysts described in the Lazier patents, it has also been shown therein that the activity of chromite catalysts so prepared may be improved still further if the calcined product is treated to remove the less active substances present in such products by leaching the said calcined product with a weak acid.

In my copending application, Serial No. 743,088, it has been shown that highly efficient chromite catalysts characterized by an increased activity in the hydrogenation and dehydrogenation of carbon compounds, are prepared by igniting a multiple chromate of a nitrogen base and a hydrogenating metal and thereafter extracting the resultant chromite with ammonia.

It is an object of this invention to prepare chromite catalysts of the general character described in the Lazier patents but showing even greater activity when used in the hydrogenation or dehydrogenation of carbon compounds in either liquid or vapor phase.

It is also an object of the present invention to provide a process for the production of superior chromite catalysts which is more economical than processes previously proposed.

Other objects and advantages of the invention will appear hereinafter.

These objects are accomplished by preparing and igniting the multiple chromates of a nitrogen base and a hydrogenating metal as described in the Lazier patents and in my copending application, Serial No. 743,088, and thereafter extracting the chromite catalyst thus obtained with ammonia in the presence of a soluble ammonium salt such as ammonium nitrate. That is, altho the preparation and ignition of the multiple chromate may be effected as described by Lazier, instead of extracting the chromite with dilute acid as shown in U. S. 1,746,782 or reducing it with hydrogen as shown in U. S. 1,964,000, the chromite, according to this invention, is treated with ammonia in the presence of a soluble ammonium salt such as ammonium nitrate to extract therefrom the uncombined hydrogenating metal oxide or hydroxide or any free chromium trioxide which may be present. The preparation of the chromites before extraction may be accomplished, by precipitation and ignition of a multiple chromate of a nitrogen base and a hydrogenating metal, as described in U. S. Patents 1,746,782, 1,746,783, 1,857,921, 1,895,516, 1,949,425, 1,964,000 or 1,964,001, but, as previously stated, it is not necessary that the chromites be reduced or acid extracted as shown by these patents. In other words, the invention substantially comprises ammonia extraction, in the presence of a soluble ammonium salt, of the chromite catalysts shown by Lazier and, as well, the use of said extracted catalysts in hydrogenations and dehydrogenations generally.

In like manner, as is set forth by Lazier in the patents above enumerated, the catalysts of this invention may be prepared, up to the extraction step, by heating multiple chromates of one or more hydrogenating metals and nitrogen bases to their spontaneous decomposition temperature. Although I shall describe the use of ammonium compounds and of particular metals, it is to be understood that by the term nitrogen base I include, besides ammonium compounds, organic derivatives such as salts of pyridine, aniline, methyl amine, and the like. In like manner other hydrogenating and dehydrogenating metals may be substituted for those described in the examples hereinafter set forth.

In order to describe the invention more fully the following examples are given, it being understood that the present invention is not limited thereby.

Example I

A catalyst consisting of copper chromite supported on "Filter Cel" was prepared in the following manner: Four hundred twenty eight grams of copper nitrate trihydrate and 176 grams of chromic acid were dissolved in 2750 cc. of water and 200 grams of "Filter Cel" was suspended in the solution by vigorous stirring. Thereafter 88 grams of anhydrous ammonia was blown into the agitated mixture after which the resulting slurry was slightly alkaline. The precipitated copper ammonium chromate thus formed was washed several times by decantation and the precipitate was then filtered, dried at 110° C., and heated for 4 hours at 450° C. to decompose the double salt to copper chromite which nevertheless was not pure but contained approximately 10% of free copper oxide. In order to remove the oxide, the presence of which adversely affects the actvity of the chromite, half of the 450 grams of chromite obtained was placed in 1500 cc. of a 10% ammonia solution in which had been dissolved 78 grams of ammonium nitrate, and stirred vigorously for 15 minutes, after which the catalyst was allowed to settle, the ammoniacal liquor containing a portion of the free copper oxide in solution was drawn off, a fresh solution of ammonia and ammonium nitrate was added and the extraction process repeated. The ammoniacal extract liquors were reserved for use in the precipitation of a new batch of copper ammonium chromate whereby the ammonia and the dissolved copper oxide were recovered and utilized. The extracted chromite after washing by decantation was dried at 110° C. and screened to a fine powder through a 14-mesh screen. Analysis of the product revealed that approximately 80% of the free copper oxide had been removed by the above extraction process.

By way of showing the improved extraction efficiency obtained by the use of ammonium nitrate, the other half of the chromite catalyst prepared as described above was extracted in the same manner as before except that the ammonium nitrate was omitted. In this case analysis of the product after extraction showed that only 10% of the free copper oxide had been removed.

*Example II*

Fourteen and seven tenths pounds of unextracted copper chromite supported on "Filter Cel" prepared in the same manner as described in Example I was added to 13 gallons of water containing 6.2 pounds of NH₃ and the mixture was stirred for 23 hours after which time analysis of samples of the ammoniacal extract liquor for copper showed that only about 10% of the free copper oxide present in the catalyst had been dissolved. A second batch of the same catalyst was extracted in the same manner except that an amount of ammonium acetate equivalent to 2% of the catalyst was added to the ammonia solution. After extraction for 23 hours as before, analysis of the extract liquor showed that about 20% of the free copper oxide had been dissolved.

*Example III*

The important effect of ammonium salts, and particularly of ammonium nitrate in increasing the efficiency of extraction of free metal oxide from chromite catalysts is clearly shown in Examples I and II. In the preparation of chromite catalysts from soluble salts of the metals such as copper nitrate for example, by precipitation of the multiple ammonium chromate with ammonia and chromic acid, soluble ammonium salts such as ammonium nitrate are formed in amounts equivalent to the soluble metallic salt. These salts remain in solution in the mother liquor and can be utilized in the subsequent extraction of the chromite catalyst.

Nine hundred sixty six pounds of

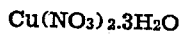

$Cu(NO_3)_2 \cdot 3H_2O$ was dissolved in 740 gallons of distilled water and 450 pounds of "Filter Cel" was added and kept in suspension by stirring. Four hundred pounds of chromic acid was then added and dissolved. Copper ammonium chromate was then precipitated on the "Filter Cel" by blowing in anhydrous ammonia until the slurry was faintly alkaline to litmus. This required about 188 pounds of NH₃. After sufficient agitation the slurry was filtered by means of a filter press. The filtrate which contained ammonium nitrate as well as a small amount of soluble chromates was stored for use in the subsequent extraction of the copper chromite while the filter cake after being dried at 120° C. was heated for four hours at about 450° C. to decompose the copper ammonium chromate to copper chromite. There was thus obtained about 1000 pounds of copper chromite containing about 10% of the free copper oxide.

The 1000 pounds of copper chromite was then extracted by suspending it in 500 gallons of the mother liquor obtained in the precipitation of the copper ammonium chromate as described above, which liquor contained about 430 pounds of ammonium nitrate and 390 pounds of anhydrous ammonia was blown into the vigorously agitated slurry. The mixture was agitated for 6.5 hours after which the catalyst was allowed to settle out and the ammoniacal extract liquor was drawn off and reserved for use in the precipitation of a new batch of copper ammonium chromate. Analysis of the copper content of this extract liquor showed that 77% of the free copper oxide contained in the copper chromite had been extracted.

The extracted chromite was then washed several times by decantation, filtered, and dried at 110–120° C. and screened to a fine powder.

The methods described above are equally applicable to the preparation of chromites of hydrogenating metals other than copper whose oxides or hydroxides are soluble in ammonia in the presence of ammonium salts. Thus, for example, hydrogenating metals such as silver, zinc, cadmium, tin, manganese, cobalt, and nickel, may be substituted for copper.

The catalysts, as prepared according to this invention, are highly suitable for hydrogenation of carbon compounds generally, such as, for example, those set forth in the Lazier patents hereinbefore enumerated, and are especially suited to the hydrogenation of the carbonyl group in acids, esters, glycerides, aldehydes, etc. Examples of such compounds are ethyl hydroxy stearate, stearic acid, furfural, coconut oil, and the like.

As an illustration of the application of the catalysts of this invention, the catalyst prepared as described in Example I was used in the hydrogenation of furfural in the following manner: 200 grams of furfural and 6 grams of the catalyst were heated and agitated in an autoclave at 175° C. and 1500–2000 lbs. pressure. Rapid absorption of hydrogen occurred and approximately 95% of the furfural was hydrogenated to furfuryl alcohol in 10–15 minutes.

In the hydrogenation of ethyl laurate to dodecyl alcohol, 150 grams of the ester and 24 grams of the supported chromite catalyst, prepared as described in Example I and containing 12 grams of copper chromite, were heated with agitation in an autoclave at 260° C. and 3000 lbs. hydrogen pressure for 5 hours. During this period hydrogen absorption occurred equivalent to 2400 lbs. pressure drop on the gage, the saponification number of the ester was reduced by 98%, and distillation of the product gave a 96% yield of dodecyl alcohol.

These catalysts also find useful application in the dehydrogenation of organic hydroxy compounds in the vapor phase, but more particularly in the liquid phase. High boiling hydroxy compounds such as octadecanediol, hydroxy stearin, cyclohexanol, methyl cyclohexanol, decahydroxy-beta-naphthol and the like are readily dehydrogenated in the liquid phase. Lower boiling compounds such as primary and secondary alcohols containing 2-10 carbon atoms are readily converted to aldehydes and ketones in the vapor phase.

In carrying out the extraction of metallic chromites as described above, the amount of ammonia required per pound of chromite may vary within rather wide limits. I prefer to use about 0.30 to 0.40 lb. of ammonia per lb. of catalyst. This amount may be reduced by half at the expense of only slightly lowered extraction efficiency, and larger amounts may be used limited only by practical economic consideration.

In the use of the ammonium salts, such soluble salts as the chromate, acetate, nitrate, chloride, or sulfate may be used. I prefer not to use the last two mentioned, however, owing to the somewhat poisonous effect of the chloride and sulfate ions on the catalyst, particularly in certain types of reactions. Ammonium nitrate is preferred above all those mentioned not only because of its greater efficiency but also because it is economically obtained as a by-product of the precipitation step leading to the formation of the double ammonium chromate.

As to the amount of ammonium salts to use in extraction, it may vary from as low as 2%, by weight of the catalyst to be extracted to as high as 40-50%. I prefer to use ammonium nitrate amounting to about 35% of the weight of catalyst extracted.

I prefer that the concentration of the ammoniacal, ammonium salt solution used for extraction be from 4% to 10% with respect to both ammonia and ammonium salt, although this limit need not be rigidly adhered to.

The advantages obtained by the above invention consist not only in the fact that highly active chromite catalysts are obtained, but also that considerably greater economy is effected by the use of ammonia and ammonium salts than by the use of acetic acid as previously described in the Lazier patents hereinbefore mentioned, particularly Lazier U. S. 1,746,782. An important feature of this invention, from the standpoint of operating economy, lies in the fact that the mother liquor recovered after precipitating the metallic ammonium chromate contains in itself sufficient ammonium salt to effect the subsequent extraction of the chromite resulting from decomposition of the said metallic ammonium chromate merely by the addition of a suitable amount of ammonia. Still further operating economy is obtained by reutilizing the spent ammoniacal extract liquor for the precipitation of a new batch of metallic ammonium chromate, thus conserving not only the ammonia content of the liquor, but also the hydrogenating metal oxide and chromium oxide contained therein, an advantage which did not exist in the previous Lazier patents which employed acetic acid as the extraction medium.

I claim:

1. In the process of hydrogenating a carbon compound capable of hydrogenation, the step which comprises subjecting said compound to the action of hydrogen under pressure in the presence of a catalyst prepared by igniting a multiple chromate of a nitrogen base and a hydrogenating metal whose oxides and hydroxides are soluble in ammonia in the presence of ammonium salts and thereafter extracting the resulting chromite composition with an aqueous solution of ammonia and a soluble ammonium salt.

2. In the process of hydrogenating a carbon compound capable of hydrogenation, the step which comprises subjecting said compound to the action of hydrogen under pressure in the presence of a catalyst prepared by igniting a multiple chromate of ammonia and a hydrogenating metal whose oxides and hydroxides are soluble in ammonia in the presence of ammonium salts and thereafter extracting the resulting chromite composition with an aqueous solution of ammonia and a soluble ammonium salt.

3. The process of claim 1 in which the carbon compound is coconut oil.

4. The process of claim 1 in which the carbon compound is furfural.

5. In the process of hydrogenating furfural the step which comprises subjecting furfural to the action of hydrogen under pressure in the presence of a catalyst prepared by heating to its decomposition temperature a multiple chromate of ammonia and a hydrogenating metal whose oxides and hydroxides are soluble in ammonia in the presence of ammonium salts and thereafter treating the resulting chromite composition with an aqueous solution of ammonia and a soluble ammonium salt.

6. The process of claim 1 in which the hydrogenating metal is copper.

7. The process of claim 1 in which the chromate is prepared by precipitating copper ammonium chromate in the presence of ammonium hydroxide.

8. The method of preparing a catalyst which comprises heating to its spontaneous decomposition temperature a multiple chromate of a nitrogen base and a hydrogenating metal whose oxides and hydroxides are soluble in ammonia in the presence of ammonium salts and thereafter treating the resulting chromite composition with an aqueous solution of ammonia and a soluble ammonium salt.

9. The method of preparing a catalyst which comprises heating to its spontaneous decomposition temperature a multiple chromate of ammonia and a hydrogenating metal whose oxides and hydroxides are soluble in ammonia in the presence of ammonium salts and thereafter extracting from the resulting chromite composition the less active constituents with a solution of ammonia and an ammonium salt, recovering and utilizing at least a part of said ammonia-ammonium salt solution for precipitation of further multiple chromate of ammonia and a hydrogenating metal.

10. The method of preparing a catalyst which comprises heating to its spontaneous decomposition temperature a multiple chromate of ammonia and a hydrogenating metal whose oxides and hydroxides are soluble in ammonia in the presence of ammonium salts and thereafter extracting the less active constituents from the resulting chromite composition with a solution of ammonia and an ammonium salt, said solution being at least in part the mother liquor resulting from precipitation of multiple chromate, and utilizing at least a part of the ammoniacal liquor resulting from extracting the chromite composition with said solution of ammonia and an ammonium salt for precipitation of the multiple chromate of ammonia and a hydrogenating metal.

11. The method of preparing a catalyst which comprises heating to its spontaneous decomposition temperature a multiple chromate of ammonia and copper and thereafter extracting the less active constituents from the resulting chromite compositions with a solution of ammonia and an ammonium salt, said solution being at least in part the mother liquor resulting from the precipitation of the multiple chromate, and utilizing at least a part of the ammoniacal liquor resulting from extracting the chromite composition with said solution of ammonia and an ammonium salt for precipitation of the multiple chromate of ammonia and copper.

12. The method of preparing a catalyst which comprises heating to its spontaneous decomposition temperature a multiple chromate of a nitrogen base and a hydrogenating metal whose oxides and hydroxides are soluble in ammonia in the presence of ammonium salts and thereafter treating the resulting chromite composition with an aqueous solution of ammonia and ammonium nitrate.

13. The method of preparing a catalyst which comprises heating to its spontaneous decomposition temperature a multiple chromate of ammonia and a hydrogenating metal whose oxides and hydroxides are soluble in ammonia in the presence of ammonium salts and thereafter extracting from the resulting chromite composition the less active constituents with a solution of ammonia and ammonium nitrate, recovering and utilizing at least a part of said ammonia-ammonium nitrate solution for precipitation of further multiple chromate of ammonia and a hydrogenating metal.

14. The method of preparing a catalyst which comprises heating to its spontaneous decomposition temperature a multiple chromate of ammonia and a hydrogenating metal whose oxides and hydroxides are soluble in ammonia in the presence of ammonium salts and thereafter extracting the less active constituents from the resulting chromite composition with a solution of ammonia and ammonium nitrate, said solution being at least in part the mother liquor resulting from precipitation of multiple chromate, and utilizing at least a part of the ammoniacal liquor resulting from extracting the chromite composition with said solution of ammonia and ammonium nitrate for precipitation of the multiple chromate of ammonia and a hydrogenating metal.

15. The method of preparing a catalyst which comprises heating to its spontaneous decomposition temperature a multiple chromate of ammonia and copper and thereafter extracting the less active constituents from the resulting chromite composition with a solution of ammonia and ammonium nitrate, said solution being at least in part the mother liquor resulting from precipitation of multiple chromate, and utilizing at least a part of the ammoniacal liquor resulting from extracting the chromite composition with said solution of ammonia and ammonium nitrate for precipitation of the multiple chromate of ammonia and a hydrogenating metal.

16. The method of preparing a catalyst which comprises heating to its spontaneous decomposition temperature a multiple chromate of a nitrogen base and a hydrogenating metal whose oxides and hydroxides are soluble in ammonia in the presence of ammonium salts and thereafter treating the resulting chromite composition with an aqueous solution of ammonia and a soluble ammonium salt, the ammonium salt used being from about 2-50% by weight of the chromite composition extracted.

17. The method of preparing a catalyst which comprises heating to its spontaneous decomposition temperature a multiple chromate of a nitrogen base and a hydrogenating metal whose oxides and hydroxides are soluble in ammonia in the presence of ammonium salts and thereafter treating the resultant chromite composition with aqueous ammonia in the presence of a soluble ammonium salt, the ammonium salt used being from about 2 to 50% by weight of the chromite composition extracted and the concentrations of ammonia and ammonium salt in the solution each being from about 4 to 10%.

PAUL L. SALZBERG.